May 6, 1958   B. PECHERER   2,833,824
PURIFICATION OF N,N'-DIPHENYL-P-PHENYLENEDIAMINE
Filed April 10, 1956
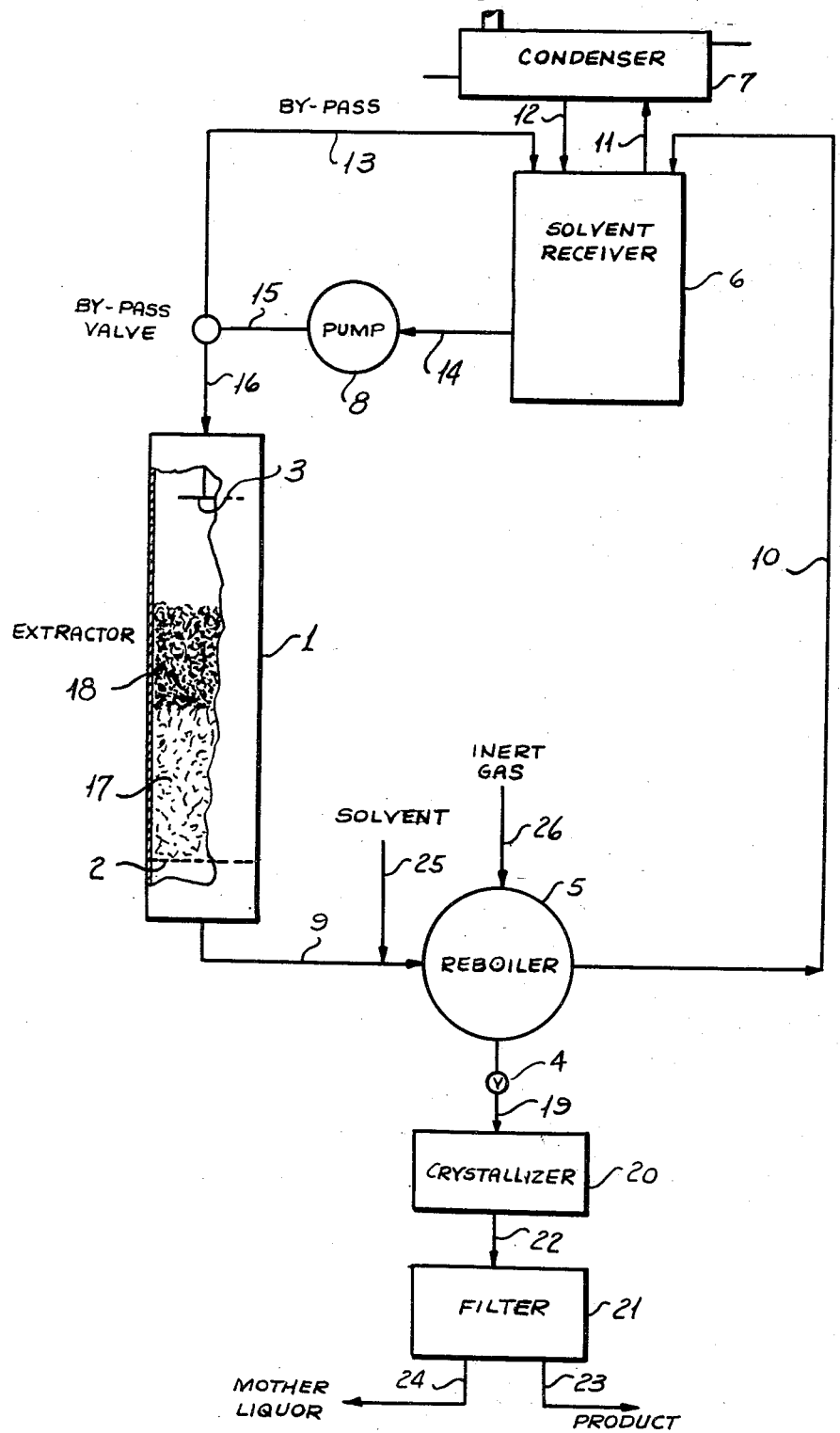

United States Patent Office 2,833,824
Patented May 6, 1958

2,833,824

PURIFICATION OF N,N'-DIPHENYL-p-PHENYLENEDIAMINE

Benjamin Pecherer, Montclair, N. J., assignor to Hoffmann-La Roche Inc., Nutley, N. J., a corporation of New Jersey Application April 10, 1956, Serial No. 577,285

5 Claims. (Cl. 260—576)

This invention relates to a method for the purification of N,N'-diphenyl-p-phenylenediamine, a substance which has antioxidant properties.

The method of this invention comprises broadly the purification of N,N'-diphenyl-p-phenylenediamine by percolating a solution of impure material, for example, a commercially available form such as 95% N,N'-diphenyl-p-phenylenediamine, through a bed of an activated clay adsorbent. A preferred procedure comprises forming a column of activated clay adsorbent in an extractor, placing the impure antioxidant on top of the column of activated clay adsorbent, continuously percolating a hot inert solvent through the impure N,N'-diphenyl-p-phenylenediamine and the activated clay adsorbent, then collecting and cooling the percolate to crystallize the pure product.

It has been found that the particular class of activated clay adsorbents described below, in contrast to conventional adsorbents generally, readily removes residual impurities from even the relatively pure 95% material so that N,N'-diphenyl-p-phenylenediamine may then be directly crystallized in pure form from the solution which has percolated through the adsorbent. The adsorbents which have been found effective for the purification of N,N'-diphenyl-p-phenylenediamine are acid activated, basic magnesium aluminum silicates. The acid activating agents are mineral acids such as hydrochloric acid, sulfuric acid, phosphoric acid, etc. The preferred activated clay adsorbent for this process is Superfiltrol (acid activated, basic magnesium aluminum silicate, commercially available from Filtrol Corp., Los Angeles, Calif.).

In order to obtain pure N,N'-diphenyl-p-phenylenediamine according to the process of this invention it is important to utilize an organic solvent which dissolves the antioxidant and impurities, which is inert to the adsorbent and to the product and from which the pure product may be readily crystallized while any traces of residual impurities remain in the mother liquor. A particularly effective group of solvents comprises benzene, toluene and chlorobenzene, toluene being most preferred.

It is essential that air and oxygen be excluded from the purification system. An inert gas atmosphere, e. g. nitrogen, carbon dioxide, etc., should be maintained.

The accompanying drawing illustrates diagrammatically a preferred embodiment for practicing the invention.

Referring to the drawing, a column of activated clay adsorbent 17 is supported on plate 2 in extractor 1. On the clay bed 17 is placed impure N,N'-diphenyl-p-phenylenediamine, 18. The solvent, such as toluene, is introduced through line 25 and is vaporized in reboiler 5. An inert gas such as nitrogen is introduced through line 26. The hot solvent vapors pass through line 10 into solvent receiver 6 where the vapors condense and the hot condensate is collected. Condenser 7 assists in condensing the solvent vapors. By-pass 13 is provided to control the flow rate of hot solvent. Hot solvent is circulated by pump 8 through lines 15 and 16 into the top of extractor 1 where distributing means 3, e. g. a sparger or shower head, sprays the hot solvent over the bed of solids in the extractor. The hot solvent gradually dissolves the impure N,N'-diphenyl-p-phenylenediamine and the solution percolates downward through the activated clay adsorbent bed which removes impurities in the solution. The percolate is collected in the extractor beneath support plate 2 and returned to the reboiler 5 through line 9. In reboiler 5 the solvent is again vaporized and continuously recirculated through the system.

As the concentration of purified N,N'-diphenyl-p-phenylenediamine builds up in the solution in reboiler 5, some solution may be drawn off, continuously or intermittently, through line 19 to crystallizer 20. Solvent make-up may be added through line 25. If desired, however, the solution may be drawn off to the crystallizer in one batch when the system is shut down for recharging. In the crystallizer the solution is cooled whereupon pure N,N'-diphenyl-p-phenylenediamine crystallizes out and is then separated from the mother liquor in filter 21. The purified N,N'-diphenyl-p-phenylenediamine may, if desired, be washed with a small amount of cold solvent, then dried in vacuo.

The following example is illustrative of the invention.

Example

A bed comprising a mixture of 25 gm. of powdered Superfiltrol (acid activated, basic magnesium silicate commercially available from Filtrol Corp., Los Angeles, Calif.) and 10 gms. of diatomaceous earth filter aid was formed in a glass column having a sintered glass disc as a base. On top of this bed were placed 35 gm. of commercially available 95% N,N'-diphenyl-p-phenylenediamine. A boiler was filled with 400 ml. of toluene. The air was displaced with nitrogen. The toluene was heated and vaporized. Solvent vapors were conducted to a condenser and the condensate was collected. The introduction of nitrogen was discontinued when solvent vapors reached the condenser. Hot condensed toluene was then distributed over the top of the material in the glass column where it percolated through the bed of solids. After passing through the bed of adsorbent, the toluene solution was collected and returned to the boiler where the solvent was again vaporized and recirculated.

The adsorbent became deep purple as the liquid percolated through. After about 3 hours all of the N,N'-diphenyl-p-phenylenediamine had been extracted and the source of heat was removed. Nitrogen was admitted to the boiler to prevent air from entering the apparatus as the hot solvent vapors condensed. The solution collected in the boiler was cooled in an ice bath for an hour during which crystals precipitated. The precipitated crystals were filtered off, given a small wash with cold toluene and then dried in vacuo until free of toluene. The collected crystals constituted pure, white N,N'-diphenyl-p-phenylenediamine, M. P. 150°–151° C. (uncorr.)

I claim:

1. A process for the purification of N,N'-diphenyl-p-phenylenediamine which comprises percolating a solution comprising impure N,N'-diphenyl-p-phenylenediamine in an inert organic solvent through acid activated, basic magnesium aluminum silicate in an inert atmosphere.

2. A process as in claim 1 wherein the solvent for the N,N'-diphenyl-p-phenylenediamine is a member of the group consisting of benzene, toluene and chlorobenzene.

3. A process as in claim 1 wherein the solvent for the N,N'-diphenyl-p-phenylenediamine is toluene.

4. A process for the purification of N,N'-diphenyl-p-phenylenediamine which comprises dissolving impure N,N'-diphenyl-p-phenylenediamine in a hot inert organic solvent, percolating the solution through a bed of acid activated, basic magnesium aluminum silicate in an inert atmosphere, cooling the percolate and separating by filtration the precipitated pure N,N'-diphenyl-p-phenylenediamine.

5. A process for the purification of N,N-diphenyl-p-phenylenediamine which comprises forming a column of activated clay adsorbent comprising acid activated, basic magnesium aluminum silicate in an extractor, placing a bed of impure N,N'-diphenyl-p-phenylenediamine on said column, continuously vaporizing inert organic solvent in a reboiler, maintaining an inert atmosphere, condensing said solvent in a receiver, passing said hot condensed solvent into said extractor, percolating said solvent through the column of solids, collecting the percolate from the extractor and passing the percolate to the reboiler, again vaporizing and recirculating solvent, drawing off solution and crystallizing therefrom purified N,N'-diphenyl-p-phenylenediamine.

References Cited in the file of this patent

UNITED STATES PATENTS

| | | |
|---|---|---|
| 2,642,389 | Cohen et al. | June 16, 1953 |
| 2,696,510 | Weedman | Dec. 7, 1954 |
| 2,744,938 | Urban | May 8, 1956 |